United States Patent
Kim et al.

(10) Patent No.: US 11,729,668 B2
(45) Date of Patent: Aug. 15, 2023

(54) APPARATUS AND METHOD FOR FRONTHAUL TRANSMISSION IN WIRELESS COMMUNICATION SYSTEM

(71) Applicant: Samsung Electronics Co., Ltd., Suwon-si (KR)

(72) Inventors: Jaeyoel Kim, Suwon-si (KR); Zhen Li, Suwon-si (KR); Daejoong Kim, Suwon-si (KR); Woojae Kim, Suwon-si (KR); Namryul Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 17/278,221

(22) PCT Filed: Sep. 20, 2019

(86) PCT No.: PCT/KR2019/012253
§ 371 (c)(1),
(2) Date: Mar. 19, 2021

(87) PCT Pub. No.: WO2020/060296
PCT Pub. Date: Mar. 26, 2020

(65) Prior Publication Data
US 2021/0352526 A1 Nov. 11, 2021

(30) Foreign Application Priority Data

Sep. 20, 2018 (KR) .................. 10-2018-0113200
Jan. 29, 2019 (KR) .................. 10-2019-0011051

(51) Int. Cl.
*H04W 28/06* (2009.01)
*H04L 1/00* (2006.01)
(Continued)

(52) U.S. Cl.
CPC ........... *H04W 28/06* (2013.01); *H04L 1/0003* (2013.01); *H04L 1/1614* (2013.01); *H04L 5/0094* (2013.01)

(58) Field of Classification Search
CPC .... H04W 28/06; H04L 1/0003; H04L 1/1614; H04L 5/0094
(Continued)

(56) References Cited

U.S. PATENT DOCUMENTS

2007/0054624 A1* 3/2007 Kashiwagi ............ H04L 1/0003
455/67.13
2017/0237831 A1 8/2017 Yang et al.
(Continued)

FOREIGN PATENT DOCUMENTS

EP           3192324 A1     7/2017
KR   10-2015-0104658 A     9/2015
(Continued)

OTHER PUBLICATIONS

International Search Report and Written Opinion of the International Searching Authority in connection with International Application No. PCT/KR2019/012253 dated Jan. 9, 2020, 11 pages.
Brubaker, David, et al. "The Emerging Need for Fronthaul Compression," White Paper, Wp-01265-1.0, Altera Corporation, Jun. 2016, 12 pages.
(Continued)

*Primary Examiner* — Christopher R Crompton

(57) ABSTRACT

The present disclosure relates to a 5th (5G) generation or pre-5G communication system for supporting a higher data transmission rate beyond a 4th (4G) generation communication system such as long term evolution (LTE). An operating method of a base station in a wireless communication system according to various embodiments of the present disclosure includes generating at least one compressed symbol based on modulation compression, transmitting to
(Continued)

another base station, control information including position indication information which indicates a position of a subcarrier at which a first subcarrier signal is transmitted in a physical resource block (PRB) to which the at least one compressed symbol is mapped, and power indication information for indicating a transmit power of the first subcarrier signal, and transmitting the at least one compressed symbol to the another base station. Thus, transmission capacity may be optimized, and efficient modulation compression is possible.

11 Claims, 15 Drawing Sheets

(51) Int. Cl.
    *H04L 1/1607* (2023.01)
    *H04L 5/00* (2006.01)
(58) Field of Classification Search
    USPC .......................................................... 370/329
    See application file for complete search history.

(56) References Cited

U.S. PATENT DOCUMENTS

| | | | |
|---|---|---|---|
| 2017/0238361 A1* | 8/2017 | Pawar | H03M 7/40 455/561 |
| 2018/0027550 A1* | 1/2018 | Berggren | H04W 72/042 370/329 |
| 2019/0289497 A1* | 9/2019 | Rajagopal | H04L 25/0256 |

FOREIGN PATENT DOCUMENTS

| | | |
|---|---|---|
| KR | 10-2017-0028984 A | 3/2017 |
| KR | 10-2017-0113030 A | 10/2017 |
| KR | 10-2017-0113316 A | 10/2017 |
| WO | 2013/084058 A1 | 6/2013 |
| WO | 2016/039839 A1 | 3/2016 |

OTHER PUBLICATIONS

Supplementary European Search Report dated Oct. 4, 2021 in connection with European Patent Application No. EP 19 86 2960, 7 pages.

* cited by examiner

FIG.11

| | Section type : DL/UL Control messages | | | | | | | #of bytes | |
|---|---|---|---|---|---|---|---|---|---|
| | 0(msb) | 1 | 2 | 3 | 4 | 5 | 6 | 7(lsb) | | |
| Transport header (1110) | Transport header, eCPRI(enhanced CPRI) or IEEE 1914.3 ||||||| 8 | Octet 1 |
| Application header (1120) | dataDirection | payloadVersion ||| filterIndex |||| 1 | Octet 9 |
| | frameId ||||||| 1 | Octet 10 |
| | subframeId ||| slotId |||| 1 | Octet 11 |
| | slotId || startSymbolid ||||| 1 | Octet 12 |
| | numberOfsections ||||||| 1 | Octet 13 |
| | sectionType = 1 ||||||| 1 | Octet 14 |
| | reserved ||||||| 1 | Octet 15 |
| | udCompHdr ||||||| 1 | Octet 16 |
| Section header (1130) | sectionId ||||||| 1 | Octet 17 |
| | sectionId ||| rb | symInc || startPrbc | 1 | Octet 18 |
| | startPrbc ||||||| 1 | Octet 19 |
| | numPrbc ||||||| 1 | Octet 20 |
| | reMask [11:4] ||||||| 1 | Octet 21 |
| | reMask [3:0] ||| numSymbol |||| 1 | Octet 22 |
| | ef | beamId [14:8] |||||| 1 | Octet 23 |
| | beamId [7:0] ||||||| 1 | Octet 24 |
| Section extender (1140) | ef | exType (=4) |||||| 1 | Octet 25 |
| | extLen (=0) ||||||| 1 | Octet 26 |
| | csf | modCompScaler [14:8] |||||| 1 | Octet 27 |
| | modCompScaler [7:0] ||||||| 1 | Octet 28 |

1100

APPARATUS AND METHOD FOR FRONTHAUL TRANSMISSION IN WIRELESS COMMUNICATION SYSTEM

CROSS-REFERENCE TO RELATED APPLICATIONS

This application is a 371 National Stage of International Application No. PCT/KR2019/012253, filed Sep. 20, 2019, which claims priority to Korean Patent Application No. 10-2018-0113200, filed Sep. 20, 2018, and Korean Patent Application No. 10-2019-0011051, filed Jan. 29, 2019, the disclosures of which are herein incorporated by reference in their entirety.

BACKGROUND

1. Field

The present disclosure generally relates to a wireless communication system, and more particularly, to an apparatus and a method for front haul transmission in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

As a transmission capacity increases in the wireless communication system, a function split which functionally splits a base station is applied. According to the function split, the base station may be split into a digital unit (DU) and a radio unit (RU), a front haul for communication between the DU and the RU is defined, and transmission through the fronthaul is required.

SUMMARY

Based on the discussions described above, the present disclosure provides an apparatus and a method for front haul transmission in a wireless communication system.

Also, the present disclosure provides an apparatus and a method for applying a modulation compression scheme to optimize a transmission capacity of a fronthaul in a wireless communication system.

Also, the present disclosure provides an apparatus and a method for defining control signals for applying a modulation compression scheme, and transmitting the control signals in a wireless communication system.

According to various embodiments of the present disclosure, an operating method of a base station in a wireless communication system includes generating at least one compressed symbol based on modulation compression, transmitting to another base station, control information including position indication information which indicates a position of a subcarrier at which a first subcarrier signal is transmitted in a physical resource block (PRB) to which the at least one compressed symbol is mapped, and power indication information for indicating a transmit power of the first subcarrier signal, and transmitting the at least one compressed symbol to the another base station.

According to various embodiments of the present disclosure, an operating method of a base station in a wireless communication system includes receiving from another base station, control information including position indication information which indicates a position of a subcarrier at which a first subcarrier signal is transmitted in a physical resource block (PRB) to which at least one compressed symbol is mapped, and power indication information for indicating a transmit power of the first subcarrier signal, receiving the at least one compressed symbol from the another base station, and applying modulation decompression to the at least one compressed symbol, based on the position indication information and the power indication information.

According to various embodiments of the present disclosure, an apparatus of a base station in a wireless communication system includes at least one processor for generating at least one compressed symbol based on modulation compression, and a transceiver for transmitting to another base station control information including position indication information which indicates a position of a subcarrier at which a first subcarrier signal is transmitted in a PRB to which the at least one compressed symbol is mapped, and power indication information for indicating a transmit power of the first subcarrier signal, and transmitting the at least one compressed symbol to the another base station.

According to various embodiments of the present disclosure, an apparatus of a base station in a wireless communication system includes a transceiver for receiving from another base station, control information including position indication information which indicates a position of a subcarrier at which a first subcarrier signal is transmitted in a PRB to which at least one compressed symbol is mapped, and power indication information for indicating a transmit power of the first subcarrier signal, and receiving the at least one compressed symbol from the another base station, and at least one processor for applying modulation decompression to the at least one compressed symbol, based on the position indication information and the power indication information.

An apparatus and a method according to various embodiments of the present disclosure may, optimize a transmission capacity, by using a modulation compression scheme for a front haul transmission.

An apparatus and a method according to various embodiments of the present disclosure may, enable efficient modulation compression, by transmitting control information including position indication information and power indication information for applying a modulation compression scheme.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

FIG. 11 illustrates a structure of control information including position indication information and power indication information in a wireless communication system according to various embodiments of the present disclosure.

DETAILED DESCRIPTION

Figure 1:
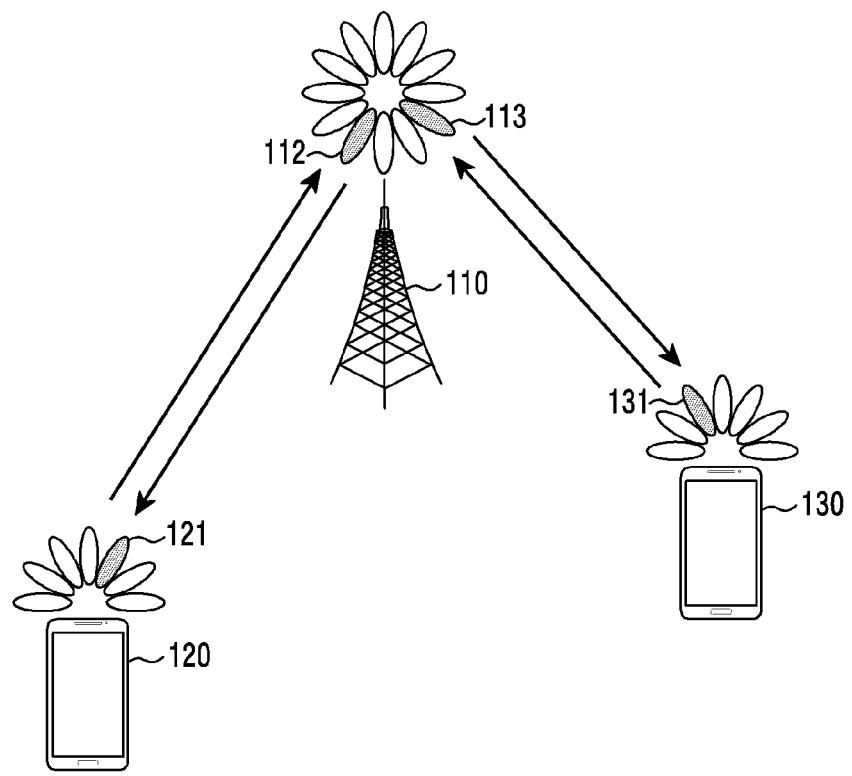
FIG. 1 illustrates a wireless communication system according to various embodiments of the present disclosure.

Hereafter, various embodiments are described in detail with reference to the attached drawings. In so doing, it should be noted that the same component in the attached drawings is indicated by the same reference numeral as possible. In addition, the drawings of the present invention attached below are provided to help understanding of the present invention, and it should be noted that the present invention is not limited to the form or arrangement illustrated in the drawings of the present invention. In addition, detailed descriptions of known functions and configurations which may obscure the subject matter of the present invention will be omitted. It should be noted that in the following descriptions, only parts necessary for understanding operations according to various embodiments of the present invention are described, and descriptions of other parts will be omitted so as not to distract the subject matter of the present invention.

In describing the embodiments, technical contents well known in the technical field to which the present invention pertains and which are not directly related to the present invention will be omitted in the descriptions. This is to more clearly provide the subject matter of the present invention by omitting unnecessary descriptions without obscuring the subject matter of the present invention.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the present invention, and methods for achieving them will be clarified with reference to embodiments described below in detail together with the accompanying drawings. However, the present invention is not limited to the embodiments disclosed below, but may be implemented in various different forms, the embodiments are provided to only complete the disclosure of the present invention and to allow those skilled in the art to which the present invention pertains to fully understand a category of the invention, and the present invention is defined merely by the category of the claims. The same reference numeral will be used to refer to the same element throughout the drawings.

At this time, it will be understood that each block of flowchart illustrations and combinations of the flowchart illustrations may be executed by computer program instructions. These computer program instructions may be mounted on a processor of a general purpose computer, special purpose computer, or other programmable data processing equipment, and accordingly instructions performed through the processor of the computer or other programmable data processing equipment create means for performing functions described in block(s) of the flowcharts. Since these computer program instructions may be stored in a computer usable or a computer readable memory which may direct the computer or the other programmable data processing equipment to implement the function in a particular manner, the instructions stored in the computer usable or computer readable memory may produce a manufacture article including instruction means which conducts the function described in the flowchart block(s). Since the computer program instructions may also be loaded on the computer or the other programmable data processing equipment, a series of operational steps may be performed on the computer or the other programmable data processing equipment to generate a computer-executed process and the instructions performing the computer or the other programmable data processing equipment may provide steps for executing the functions described in the flowchart block(s).

Also, each block may represent a module, a segment or a portion of code including one or more executable instructions for executing specified logical function(s). It should also be noted that the functions mentioned in the blocks in some alternative implementations may occur out of sequence. For example, two blocks shown in succession may in fact be executed substantially simultaneously or the blocks may be sometimes executed in reverse order according to a corresponding function.

At this time, the term '~ unit' used in the present embodiment indicates software or a hardware component such as a field programmable gate array (FPGA) or an application-specific integrated circuit (ASIC), and '~ unit' performs specific tasks. However, '~ unit' is not limited to the software or the hardware. The '~ unit' may be configured to be in an addressable storage medium or may be configured to reproduce one or more processors. Thus, as an example, '~ unit' includes components such as software components, object-oriented software components, class components and task components, processes, functions, attributes, procedures, sub-routines, segments of program code, drivers, firmware, microcode, circuitry, data, databases, data structures, tables, arrays, and variables. Functionalities provided in the components and '~ units' may be combined into fewer components and '~ units' or may be further separated into additional components and '~ units'. Besides, the components and '~ units' may be implemented to reproduce one or more central processing units (CPUs) within a device or a security multimedia card.

Terms used in the present disclosure are used for describing particular embodiments and are not intended to limit the scope of other embodiments. A singular form may include a plurality of forms unless it is explicitly differently represented. All the terms used herein including technical and scientific terms may have the same meanings as terms generally understood by those skilled in the art of the present disclosure. The terms defined in a general dictionary among terms used in the present disclosure may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereinafter, the present disclosure relates to an apparatus and a method for front haul transmission in a wireless communication system. Specifically, the present disclosure describes a technique for performing modulation compression in the wireless communication system, and transmitting control information (e.g., position indication information, power indication information) for the modulation compression.

Terms indicating signals, terms indicating channels, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standard (e.g., 3rd generation partnership project (3GPP)), which are merely exemplary for explanations. Various embodiments of the present disclosure may be easily modified and applied in other communication systems.

FIG. 1 illustrates a wireless communication system according to various embodiments of the present disclosure. FIG. 1 depicts a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure for providing radio access to the terminals 120 and 130. The base station 110 has coverage defined as a specific geographical area based on a signal transmission distance. The base station 110 may be referred to as, besides the base station, an 'access point (AP)', an 'eNodeB (eNB)', a '5th generation node (5G node)', a 'gNodeB (gNB)', a 'wireless point', a 'transmission/reception point (TRP)', or other terms having technically identical meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a 'user equipment (UE)', a 'mobile station', a 'subscriber station', a 'remote terminal', a 'wireless terminal', or a 'user device', or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve a channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search or beam management procedure. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receiver parameter.

Figure 2:
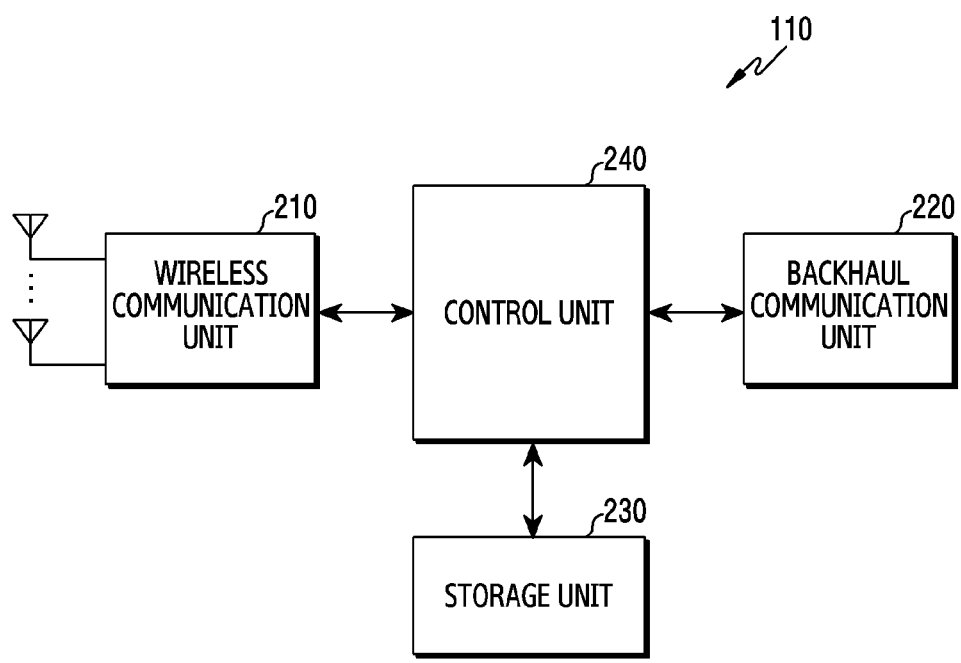
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as '~ unit' or '~ er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit stream according to a physical layer standard of the system. For example, in data transmission, the wireless communication unit 210 generates complex symbols by encoding and modulating a transmit bit stream. Also, in data reception, the wireless communication unit 210 restores a receive bit stream by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power and an operating frequency. The digital unit may be implemented with at least one processor (e.g., a digital signal processor (DSP)).

The wireless communication unit 210 transmits and receives the signals as stated above. Hence, whole or part of the wireless communication unit 210 may be referred to as a 'transmitter', a 'receiver', or a 'transceiver'. Also, in the following, the transmission and the reception over the radio channel is used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to other node, for example, to other access node, other base station, an upper node, or a core network, to a physical signal, and converts a physical signal received from the other node to a bit stream.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to another implementation, the protocol stack may be included in the wireless communication unit 210. For doing so, the control unit 240 may include at least one processor.

According to various embodiments, the control unit 240 may generate a compressed symbol based on modulation compression, transmit control information (e.g., position indication information, power indication information) relating to the modulation compression, and transmit the compressed symbol. In addition, the control unit 240 may receive a compressed symbol, receive control information relating to the modulation compression, and apply decompression based on the control information. For example, the control unit 240 may control the base station 240 to carryout operations according to various embodiments to be described.

Figure 3:
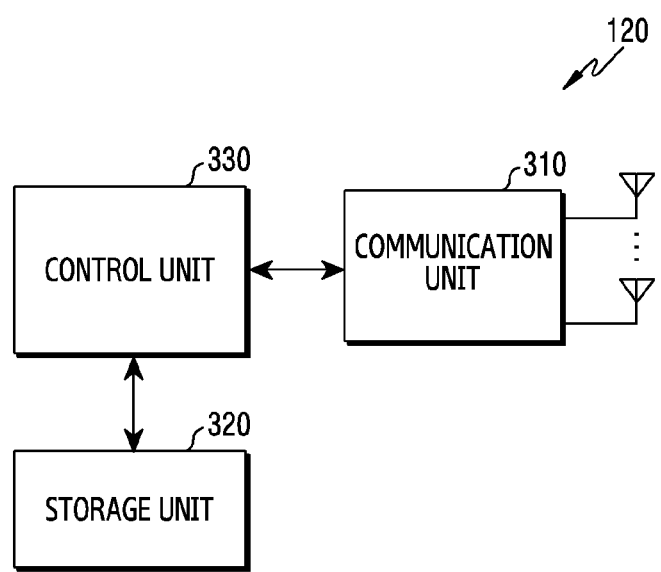
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as '~ unit' or '~ er' used hereafter indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 may perform functions for transmitting and receiving signals over a radio channel. For example, the communication unit 310 performs a conversion function between a baseband signal and a bit stream according to a physical layer standard of the system. For example, in data transmission, the communication unit 310 generates complex symbols by encoding and modulating a transmit bit stream. Also, in data reception, the communication unit 310 restores a receive bit stream by demodulating and decoding a baseband signal. Also, the communication unit 310 up-converts the baseband signal to an RF band signal and transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the wireless communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 transmits and receives the signals as stated above. Hence, whole or part of the communication unit 310 may be referred to as a 'transmitter', a 'receiver', or a 'transceiver'. In addition, the transmission and the reception over the radio channel are used as the meaning which embraces the above-stated processing of the communication unit 310 in the following explanations.

The storage unit 320 stores a basic program for operating the terminal, an application program, and data such as setting information. The storage unit 320 may include a volatile memory, a non-volatile memory or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. In addition, part of the communication unit 310 and the control unit 330 may be referred to as a communication processor (CP).

According to various embodiments, the control unit 330 may control the terminal to carry out operations to be explained according to various embodiments.

Figure 4:
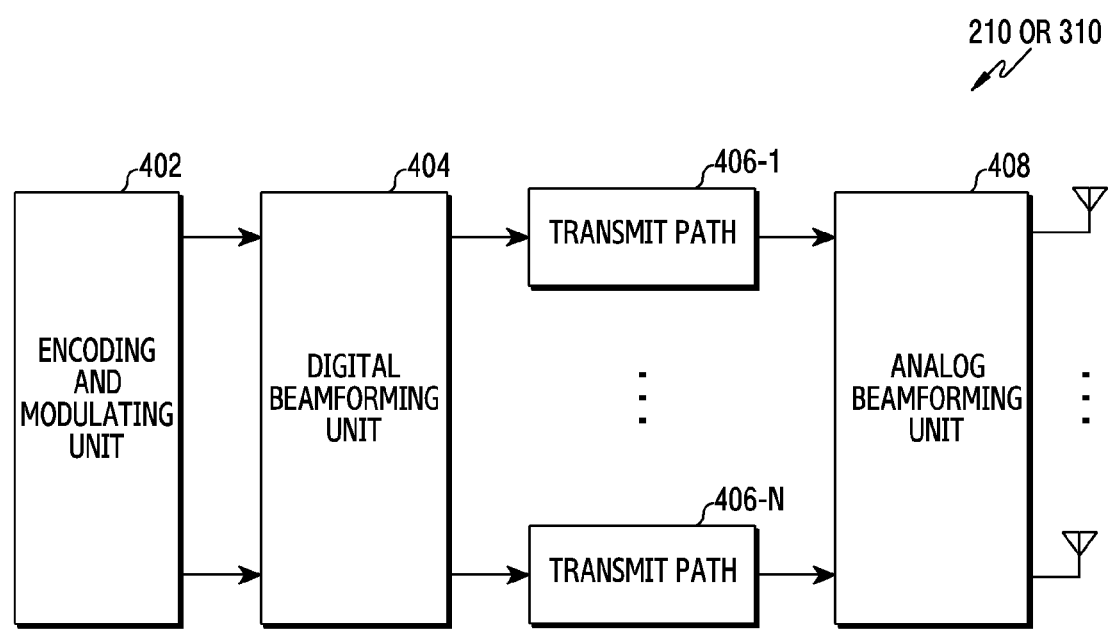
FIG. 4 illustrates a configuration of a communication unit in a wireless communication system according to various embodiments of the present disclosure.

FIG. 4 illustrates a configuration of a communication unit in a wireless communication system according to various embodiments of the disclosure. FIG. 4 depicts an example of a detailed configuration of the wireless communication unit 210 of FIG. 2 or the communication unit 310 of FIG. 3. Specifically, FIG. 4 depicts components for performing the beamforming, as part of the wireless communication unit 210 of FIG. 2 or the communication unit 310 of FIG. 3.

Referring to FIG. 4, the wireless communication unit 210 or the communication unit 310 includes an encoding and modulating unit 402, a digital beamforming unit 404, a plurality of transmit paths 406-1 through 406-N, and an analog beamforming unit 408.

The encoding and modulating unit 402 performs channel encoding. For the channel encoding, at least one of low density parity check (LDPC) code, convolution code, and polar code may be used. The encoding and modulating unit 402 generates modulation symbols by performing constellation mapping.

The digital beamforming unit 404 beamforms a digital signal (e.g., the modulation symbols). For doing so, the digital beamforming unit 404 multiplies the modulation symbols by beamforming weights. Herein, the beamforming weights are used to change an amplitude and a phase of the signal, and may be referred to as a 'precoding matrix' or a 'precoder'. The digital beamforming unit 404 outputs the digital-beamformed modulation symbols to the plurality of the transmit paths 406-1 through 406-N. In so doing, according to a multiple input multiple output (MIMO) transmission scheme, the modulation symbols may be multiplexed, or the same modulation symbols may be provided to the plurality of the transmit paths 406-1 through 406-N.

The plurality of the transmit paths 406-1 through 406-N convert the digital-beamformed digital signals to analog signals. For doing, the plurality of the transmit paths 406-1 through 406-N each may include an inverse fast Fourier transform (IFFT) operator, a cyclic prefix (CP) adder, a DAC, and an up-converter. The CP adder is used for an orthogonal frequency division multiplexing (OFDM) scheme, and may be excluded if another physical layer scheme (e.g., filter bank multi-carrier (FBMC)) is applied. That is, the plurality of the transmit paths 406-1 through 406-N provide an independent signal process for a plurality of streams generated through the digital beamforming. Yet, depending on the implementation, some of the components of the plurality of the transmit paths 406-1 through 406-N may be used in common.

The analog beamforming unit 408 beamforms the analog signals. For doing so, the digital beamforming unit 404 multiplies the analog signals by the beamforming weights. Herein, the beamforming weights are used to change the amplitude and the phase of the signal. Specifically, according to the connection structure between the plurality of the transmit paths 430-1 through 430-N and the antennas, the analog beamforming unit 440 may be configured variously. For example, the plurality of the transmit paths 430-1 through 430-N each may be connected to one antenna array. As another example, the plurality of the transmit paths 430-1 through 430-N may be connected to one antenna array. As another example, the plurality of the transmit paths 430-1 through 430-N may be adaptively connected to one antenna array, or two or more antenna arrays.

In a communication system having a relatively great cell radius of a base station according to characteristics of a use frequency, each base station is installed such that each base station includes functionality of a digital processing unit (or a digital unit (DU)) and a radio frequency (RF) processing unit (or a radio unit (RU)). However, as a 4th generation (4G) and/or next communication system uses a high frequency band and the cell radius of the base station reduces, the number of base stations for covering a specific area has increased and an installation cost burden of an operator for installing the increased base stations has increased. Thus, to minimize the installation cost of the base station, the DU and the RU of the base station are separated to connect one or more RUs to one DU over a wired network, and one or more RUs geographically distributed to cover a specific area has installed. Herein, the connection network between the DU and the RU may be referred to as a 'fronthaul'. To operate the fronthaul, an interface such as, for example, a common public radio interface (CPRI) may be used.

In a 5th generation (5G) communication system (or a new radio (NR) communication system), a use frequency band is further increased, and the number of RUs required to be installed has further increased as the cell radius of the base station becomes very small. In addition, in the 5G communication system, an amount of data transmitted greatly increases 10 times or more, and a transmission capacity of the wired network transmitted via the fronthaul is considerably increased. Due to these factors, an installation cost of the wired network in the 5G communication system may be greatly increased. Thus, to reduce the transmission capacity of the wired network and to reduce the installation cost of the wired network, techniques for reducing the transmission capacity of the fronthaul by transferring some functions of a modem of the DU to the RU, and these technologies may be referred to as 'function split'.

Recently, standard establishment for a transmission technology or a transmission scheme of the fronthaul including the fronthaul was conducted in an extensible radio access network (xRAN) standard organization, and a future open radio access network (oRAN) standard organization is also to work on continuous standard establishment based on the standard establishment of the transmission technology or the transmission scheme of the fronthaul. According to the function split technology discussed in the xRAN standard technology, some functions (e.g., channel coding, modulation, layer mapping, antenna port mapping and resource element (RE) per layer mapping) of the modem may be conducted in the DU, and the rest functions (e.g., digital beamforming, Fourier transform) of the modem may be performed in the RU.

If the function split technology is applied, the fronthaul transmission capacity may be considerably reduced comparing with not applying the function split technology as shown in Table 1 below (i.e., if all of the functions of the modem including the digital beamforming and the Fourier transform are conducted in the DU).

TABLE 1

| | The case w/o the function split technology (Opt. 8) | The case with the function split technology in the xRAN standard (Opt. 7-2x) |
|---|---|---|
| Fronthaul transmission capacity | 86.51 Gbps | 49.96 Gbps |

For the fronthaul transmission capacity of <Table 1>, it is assumed that the frequency band is over 6 GHz, the numbers of transmit antenna ports and receive antenna ports used are two respectively, a frequency bandwidth (BW) is 800 MHz, and the number of downlink layers is two.

However, even though the function split technology of the xRAN is used, since the transmission capacity of the fronthaul is still very great, the installation cost of the wired network may be very high. Thus, to further optimize the transmission capacity of the fronthaul, a technology for further lowering the transmission capacity by using a compression technique on the transmit signal may be used. For example, the above-described compression technique may include at least one of block floating, block scaling, u-law scheme, beam space, and modulation compression. Herein, in terms of theoretical efficiency, the modulation compression may be the most optimized compression technique. The modulation compression scheme may include a technique for compressing a signal while reducing degradation of signal quality in a system which uses a modulation scheme such as a communication system. For example, the modulation compression scheme may be used by a transmitting device of the communication system, and the transmitting device may compress a signal while reducing the degradation of the signal quality using the modulation compression scheme.

The xRAN standard proposes the modulation compression scheme as an available technology, but the fronthaul transmission efficiency may not be increased merely with contents of the xRAN standard because the xRAN standard does not substantially define essential control information for using the modulation compression scheme.

Accordingly, various embodiments of the present disclosure provide an apparatus and a method for applying the modulation compression scheme to optimize the transmission capacity of the fronthaul.

Further, various embodiments of the present disclosure define control signals for applying the modulation compression scheme, and provide an apparatus and a method for transmitting the control signals.

Figure 5:
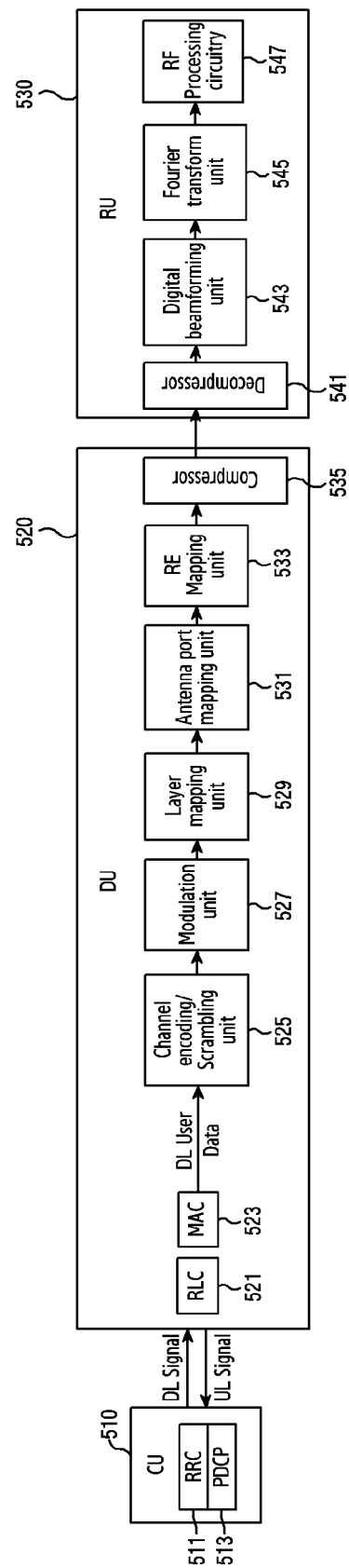
FIG. 5 illustrates a configuration of a base station to which function split is applied in a wireless communication system according to various embodiments of the present disclosure.

FIG. 5 illustrates a configuration of a base station to which function split is applied in a wireless communication system according to various embodiments of the present disclosure. A term such as '~ unit' or '~ er' used hereafter indicates a unit for processing at least one function or operation, and may be implemented using hardware, software, or a combination of hardware and software.

In various embodiments, one base station (e.g., the base station 110) may include at least one of a central unit (CU) 510, a DU 520, or a RU 530. For example, the CU 510, the DU 520 and the RU 530 may be included in different base stations respectively, or at least two units of the CU 510, the DU 520 and the RU 530 may be included in the same base station. Accordingly, each of the CU 510, the DU 520 and the RU 530 may have the configuration of the base station 110 illustrated in FIG. 2. As another example, a combination of at least two of the CU 510, the DU 520 and the RU 530 may have the configuration of the base station 110 illustrated in FIG. 2.

Referring to FIG. 5, the CU 510 may include a radio resource control (RRC) processing unit 511 and a packet data convergence protocol (PDCP) processing unit 513.

The RRC processing unit 511 may transmit and receive a control message for controlling radio resources. For example, the RRC processing unit 511 may transmit and receive configuration control messages related to access and/or measurement.

The PDCP processing unit 513 may perform internet protocol (IP) header compression to reduce the number of bits transmitted through an air interface. Also, the PDCP processing unit 513 may perform ciphering and integrity protection for the transmit data.

The CU 510 may transmit downlink signals processed by the RRC processing unit 511 and/or the PDCP processing unit 513 to the DU 520, receive uplink signals from the DU 520, and process the uplink signals at the RRC processing unit 511 via the PDCP processing unit 513.

The DU 520 includes a radio link control (RLC) processing unit 521, a media access control (MAC) processing unit 523, a channel encoding/scrambling unit 525, a modulation unit 527, a layer mapping unit 529, an antenna port mapping unit 531, an RE mapping unit 533 and a compression unit 535. The RU 530 includes a decompression unit 541, a digital beamforming unit 543, a Fourier transform unit 545, and RF processing circuitry 547. According to various embodiments of the present disclosure, the components such as the channel encoding/scrambling unit 525, the modulation unit 527, the layer mapping unit 529, the antenna port mapping unit 531, the RE mapping unit 533, the compression unit 535, the decompression unit 541, the digital beamforming unit 543, the Fourier transform unit 545, and the RF processing circuitry 547 may be included in the modem, and the modem may perform a function of each component. In other words, the DU 520 may include part of the modem, or perform some functions of the modem, and the RU 530 may include remaining part of the modem, or perform remaining functions of the modem.

In the DU 520, downlink data may be inputted to the channel encoding/scrambling unit 525 through the RLC processing unit 521 and the MAC processing unit 523. The RLC processing unit 521 may perform segmentation/concatenation on data, and manage retransmission of the data. The MAC processing unit 523 may handle hybrid automatic repeat request (HARD) retransmission, and downlink scheduling.

The channel encoding/scrambling unit 525 may encode the data inputted from the MAC processing unit 521, and scramble the encoded data. The channel encoding/scrambling unit 525 may forward the scrambled data to the modulation unit 527.

The modulation unit 527 may output modulation symbols for each input signal unit according to a modulation order, with respect to the data inputted to the modulation unit 527. The modulation unit 527 may forward the outputted modulation symbol to the layer mapping unit 529.

The layer mapping unit 529 allocates the modulation symbols to each layer, and provides data corresponding to each layer to the antenna port mapping unit 531. The antenna port mapping unit 531 allocates data corresponding to layers to each antenna port, and the RE mapping unit 533 may map the data corresponding to each layer (or, each antenna port) to REs of a resource grid. In other words, through the layer mapping, the antenna port mapping, and the RE mapping per layer, a signal to be transmitted may be arranged for each frequency, for each antenna and/or for each layer. The signal mapped to the RE by the RE mapping unit 533 may be compressed by the compression unit (or the modulation compression unit) 535, and then transmitted to the RU 530 through the fronthaul.

The compression unit 535 may perform the modulation compression. In other words, the number of bits corresponding to the modulation symbols may be reduced, by compressing the modulation symbols. Hereinafter, examples of the modulation symbols which are the output of the modulation unit 527 before the compression by the compression unit 535 is performed are described in FIGS. 6A and 6B, and the modulation symbols compressed by the compression unit 535 are described in FIGS. 7A and 7B.

In FIG. 5, it is illustrated that the modulation compression unit 535 is connected to the output of the RE mapping unit 533, but this is exemplary, and various modifications may be made to the position of the modulation compression unit 535. For example, the modulation compression unit 535 may be connected to the output of the modulation unit 527, to the output of the layer mapping unit 529, or to the output of the antenna port mapping unit 531, and may compress the modulation symbols of each output signal. As another example, the modulation compression unit 535 may be included in the modulation unit 527. In this case, the modulation unit 527 (and/or the compression unit 535 included in the modulation unit 527) may generate modulation symbols by modulating coded bits, and then compress the modulation symbols, or generate compressed symbols from coded bits, without generating explicit modulation symbols. That is, the modulation unit 527 (and/or the compression unit 535 included in the modulation unit 527) may obtain the compressed symbols from the coded bits, based on a conversion table for the modulation compression. Herein, the conversion table for the modulation compression indicates a mapping relationship between the coded bits and each compressed symbol.

Meanwhile, the configuration disclosed in FIG. 2 is exemplary, and embodiments of the present invention may be variously configured. As a structure which indicates a distributed arrangement, each unit may be distinguished with a central unit (CU) and a distributed unit (DU), and a digital unit (DU) and a radio unit (RU) may be distinguished and used, as a structure for indicating the distinction of digital processing and wireless RF processing. For example, the network entity may be divided into the CU and the distributed unit (DU), and the DU may be further divided into the digital unit (DU) and the RU as shown in FIG. 2. As another example, the CU may correspond to a distributed unit (DU) and the DU to the radio unit (RU). Meanwhile, the digital unit (DU) may be referred to as a baseband unit (BBU), and the RU may be referred to as a remote radio head (RRH). Hereinafter, the present disclosure has been described that the DU is referred to as the digital unit (DU) unless defined otherwise. In addition, a network entity which performs a function for each CU, DU or DU, or RU may be referred to as a network node, a communication node, communication equipment, a communication device, and so on, besides a base station.

Figure 6A:
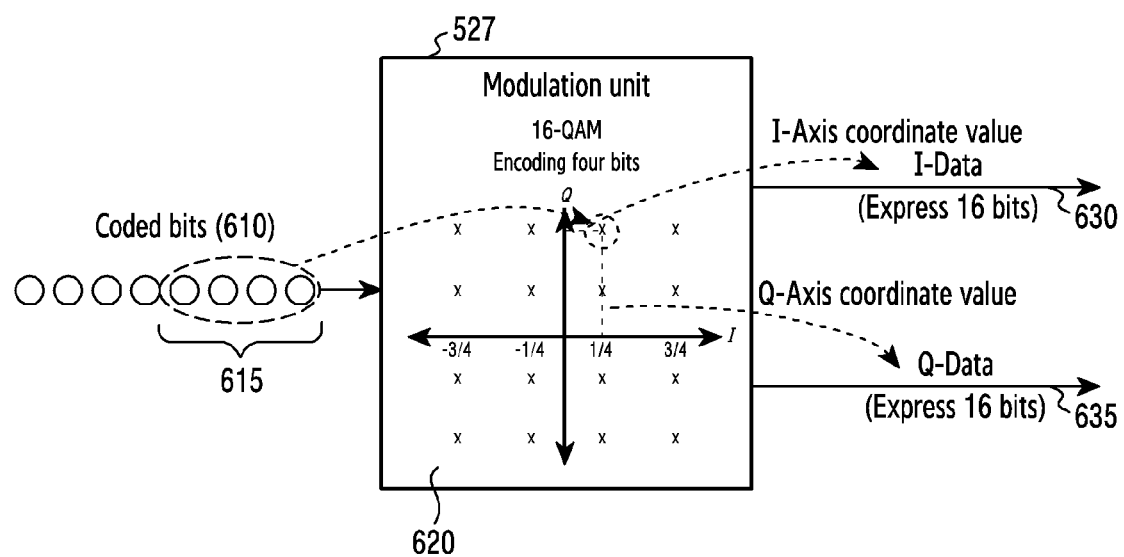
FIGS. 6A and 6B illustrate generation of modulation symbols in a wireless communication system according to various embodiments of the present disclosure.
Figure 6B:
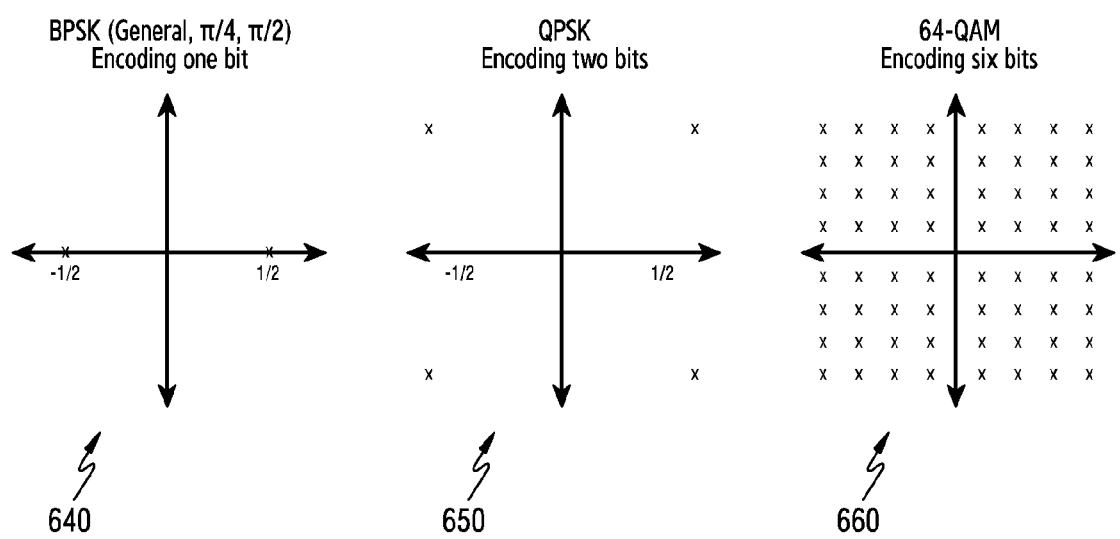

FIGS. 6A and 6B illustrate generation of modulation symbols in a wireless communication system according to various embodiments of the present disclosure.

Referring to FIG. 6A, the modulation unit 527 modulates encoded data 610, to generate in-phase data 630 expressed by 16 bits, and quadrature-phase data 635 expressed by 16 bits. If the modulation unit 527 generates the modulation symbols according to a modulation scheme of 16 quadrature amplitude modulation (QAM), with respect to an input signal of 4-bit unit, the modulation unit 527 may output an I-axis coordinate value and a Q-axis coordinate value corresponding to the input signal in 16 coordinates expressible with 4 bits in a constellation 620 corresponding to the 16QAM as I-data and Q-data respectively. The I-data and the Q-data each are a real value, and may be expressed by 16 bits. In other words, if the modulation unit 527 generates the modulation symbols according to the modulation scheme of the 16QAM, since the 4-bit coded bits are modulated to 32-bit modulation symbols, 8 bits are modulated per coded bit.

As another example, if the modulation unit 527 generates the modulation symbols according to a modulation scheme of binary phase shift keying (BPSK), with respect to an input of 1-bit unit, the modulation unit 527 may output an I-axis coordinate value and a Q-axis coordinate value corresponding to the input signal in two coordinates expressible by one bit in a constellation 640 corresponding to the BPSK as I-data and Q-data respectively. The I-data and the Q-data each are a real value, and may be expressed by 16 bits. In other words, if the modulation unit 527 generates the modulation symbols according to the BPSK modulation scheme, since the 1-bit coded bit is modulated to 32-bit modulation symbols, 32 bits are modulated per coded bit.

As another example, if the modulation unit 527 generates the modulation symbols according to a quadrature phase shift keying (QPSK) modulation scheme, with respect to an input signal of 2-bit unit, the modulation unit 527 may output an I-axis coordinate value and a Q-axis coordinate value corresponding to the input signal in four coordinates expressible by two bits in a constellation 650 corresponding to the QPSK as I-data and Q-data respectively. The I-data and the Q-data each are a real value, and may be expressed by 16 bits. In other words, if the modulation unit 527 generates the modulation symbols according to the BPSK modulation scheme, since the 2-bit coded bits are modulated to 32-bit modulation symbols, 16 bits are modulated per coded bit.

As another example, if the modulation unit 527 generates the modulation symbols according to a 64QAM modulation scheme, with respect to an input signal of 6-bit unit, the modulation unit 527 may output an I-axis coordinate value and a Q-axis coordinate value corresponding to the input signal in 64 coordinates expressible by 6 bits in a constellation 660 corresponding to the 64QAM as I-data and Q-data respectively. The I-data and the Q-data each are a real value, and may be represented by 16 bits. In other words, if the modulation unit 527 generates the modulation symbols according to the 64QAM modulation scheme, since 6-bit coded bits are modulated to 32-bit modulation symbols, 5.33 bits are modulated per coded bit.

As another example, if the modulation unit 527 generates the modulation symbols according to a 256QAM modulation scheme, with respect to an input signal of 8-bit unit, the modulation unit 527 may output an I-axis coordinate value and a Q-axis coordinate value corresponding to the input signal in 256 coordinates expressible by 8 bits in a constellation corresponding to the 256QAM as I-data and Q-data respectively. The I-data and the Q-data each are a real value, and may be represented by 16 bits. In other words, if the modulation unit 527 generates the modulation symbols according to the 256QAM modulation scheme, since the 8-bit coded bits are modulated to 32-bit modulation symbols, four bits are modulated per coded bit.

As described above, since the number of the bits for the modulation symbol is far more than the coded bits, if the DU (e.g., the DU 520) transmits the modulation symbols to the fronthaul, a considerable transmission amount may be required. Thus, compression of the modulation symbols (i.e., the modulation compression) is required, for the sake of efficiency of the transmission amount.

According to various embodiments of the present disclosure, the modulation compression indicates a scheme which represents a real value (e.g., an in-phase component value and/or a quadrature-phase component value) representing the modulation symbol, as an index of a corresponding real value among available real values for a modulation order of the modulation symbol, and the index of the real value may be referred to as a 'compressed symbol'. The DU may generate the compressed symbol, based on the modulation compression. In various embodiments, the compressed symbol may be generated by generating modulation symbols and then compressing the modulation symbols. Also, the compressed symbol may be generated directly from the coded bits, without generating explicit modulation symbols. For example, the DU may obtain the compressed symbols from the coded bits, based on the conversion table for the modulation compression. Herein, the conversion table for the modulation compression indicates the mapping relationship between the coded bits and each compressed symbol.

Figure 7A:
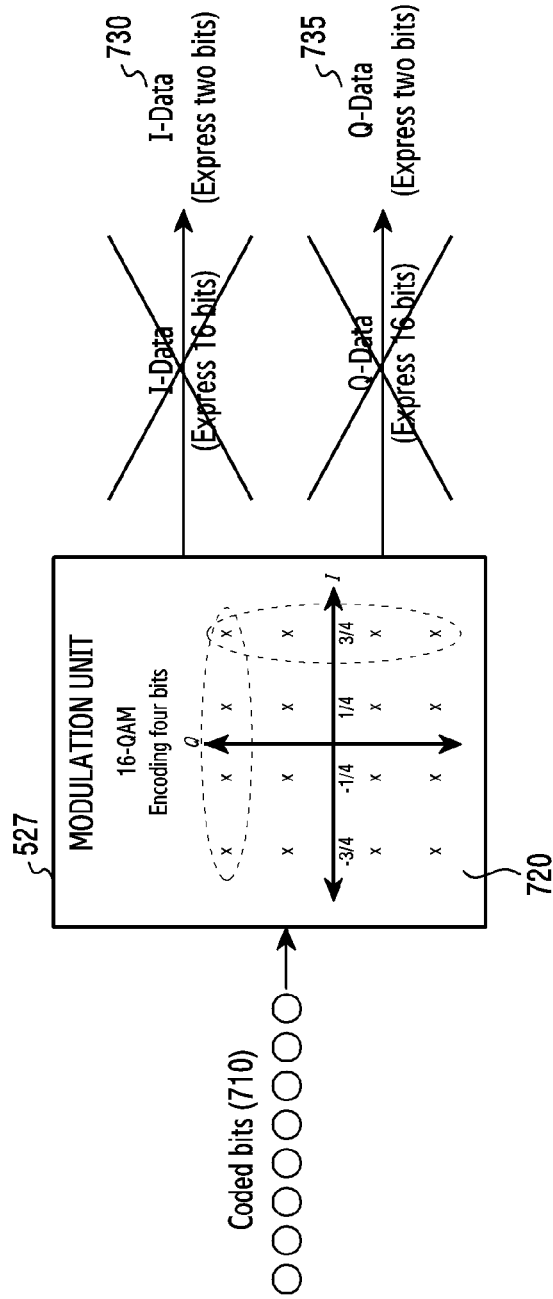
FIGS. 7A and 7B illustrate generation of compressed symbols in a wireless communication system according to various embodiments of the present disclosure.
Figure 7B:
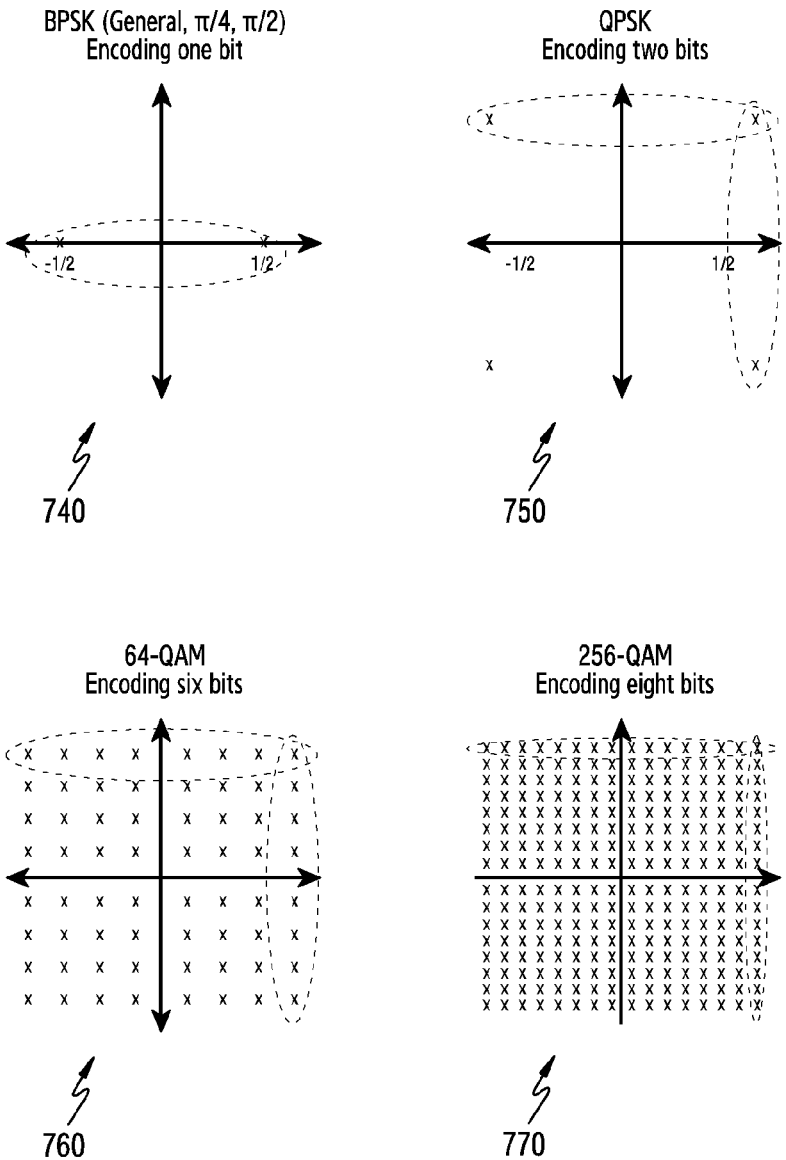

FIGS. 7A and 7B illustrate generation of compressed symbols in a wireless communication system according to various embodiments of the present disclosure.

Referring to FIG. 7A, if the modulation unit 527 is based on the 16QAM modulation scheme, the modulation unit 527 may modulate coded bits 710, and thus generate I-data 730 expressed by 2 bits and Q-data expressed by 2 bits. In a constellation 720 corresponding to the 16QAM, there are four available I-axis coordinate values and four available Q-axis coordinate values. Since an actual value of the I-data expressed by 16 bits is one of the four real values, it may be expressed by 2-bit information. Similarly, since an actual value of the Q-data expressed by 16 bits is one of four real values, it may be expressed by 2-bit information. Hence, if the 16QAM modulation scheme is used, the compressed symbol may be expressed by 4 bits.

As another example, if the modulation unit 527 is based on the BPSK modulation method, since there are two available I-axis coordinate values and one available Q-axis coordinate value in a constellation 740 corresponding to the BPSK, I-data excluding Q-data may be expressed by 1 bit. Hence, if the BPSK modulation scheme is used, the compressed symbol may be expressed by 1 bit.

As another example, if the modulation unit 527 is based on the QPSK the modulation scheme, since there are two possible I-axis coordinate values and two possible Q-axis coordinate values in a constellation 750 corresponding to the QPSK, I-data and Q-data each may be expressed by 1 bit. Thus, if the QPSK modulation scheme is used, the compressed symbol may be expressed by 2 bits.

As another example, if the modulation unit 527 is based on the 64QAM modulation scheme, since there are eight possible I-axis coordinate values and eight possible Q-axis coordinate values in a constellation 760 corresponding to 64QAM, I-data and Q-data each may be expressed by 3 bits. Hence, if the 64QAM modulation scheme is used, the compressed symbol may be expressed by 6 bits.

As another example, if the modulation unit 527 is based on the 256QAM modulation scheme, since there are 16 possible I-axis coordinate values and 16 possible Q-axis coordinate values in a constellation 770 corresponding to 256QAM, I-data and Q-data each may be expressed by 4 bits. Thus, if the 64QAM modulation scheme is used, the compressed symbol may be expressed by 8 bits.

If the modulation compression scheme as mentioned above is applied, the optimized compression may be achieved without loss of information.

In various embodiments, the modulation unit 527 (and/or the compression unit 535 included in the modulation unit 527) may generate the compressed symbols directly from the coded bits, without generating explicit modulation symbols. That is, the modulation unit 527 (and/or the compression unit 535 included in the modulation unit 527) may obtain the compressed symbols from the coded bits, based on the conversion table for the modulation compression. Herein, the conversion table for the modulation compression indicates the mapping relationship between the coded bits and each compressed symbol. As an example of the conversion table, a conversion table for compressing the modulation symbols corresponding to the modulation order of 16QAM (or, for generating the compressed symbols corresponding to the modulation order of 16QAM) is shown in Table 2 as follows.

TABLE 2

| Coded bits | Compressed symbol (16QAM) | |
|---|---|---|
| | I-data | Q-data |
| 0000 | 10 | 10 |
| 0001 | 10 | 11 |
| 0010 | 11 | 10 |
| 0011 | 11 | 11 |
| 0100 | 10 | 01 |
| 0101 | 10 | 00 |
| 0110 | 11 | 01 |
| 0111 | 11 | 00 |
| 1000 | 01 | 10 |
| 1001 | 01 | 11 |
| 1010 | 00 | 10 |
| 1011 | 00 | 11 |
| 1100 | 01 | 01 |
| 1101 | 01 | 00 |
| 1110 | 00 | 01 |
| 1111 | 00 | 00 |

The modulation compression scheme may be used for the communication between the DU (e.g., the DU 520) and the RU (e.g., the RU 530) in the communication system to which the function split is applied. Detailed operations for using the modulation compression scheme in the communication system to which the function split is applied are described in FIG. 8 below.

Figure 8:
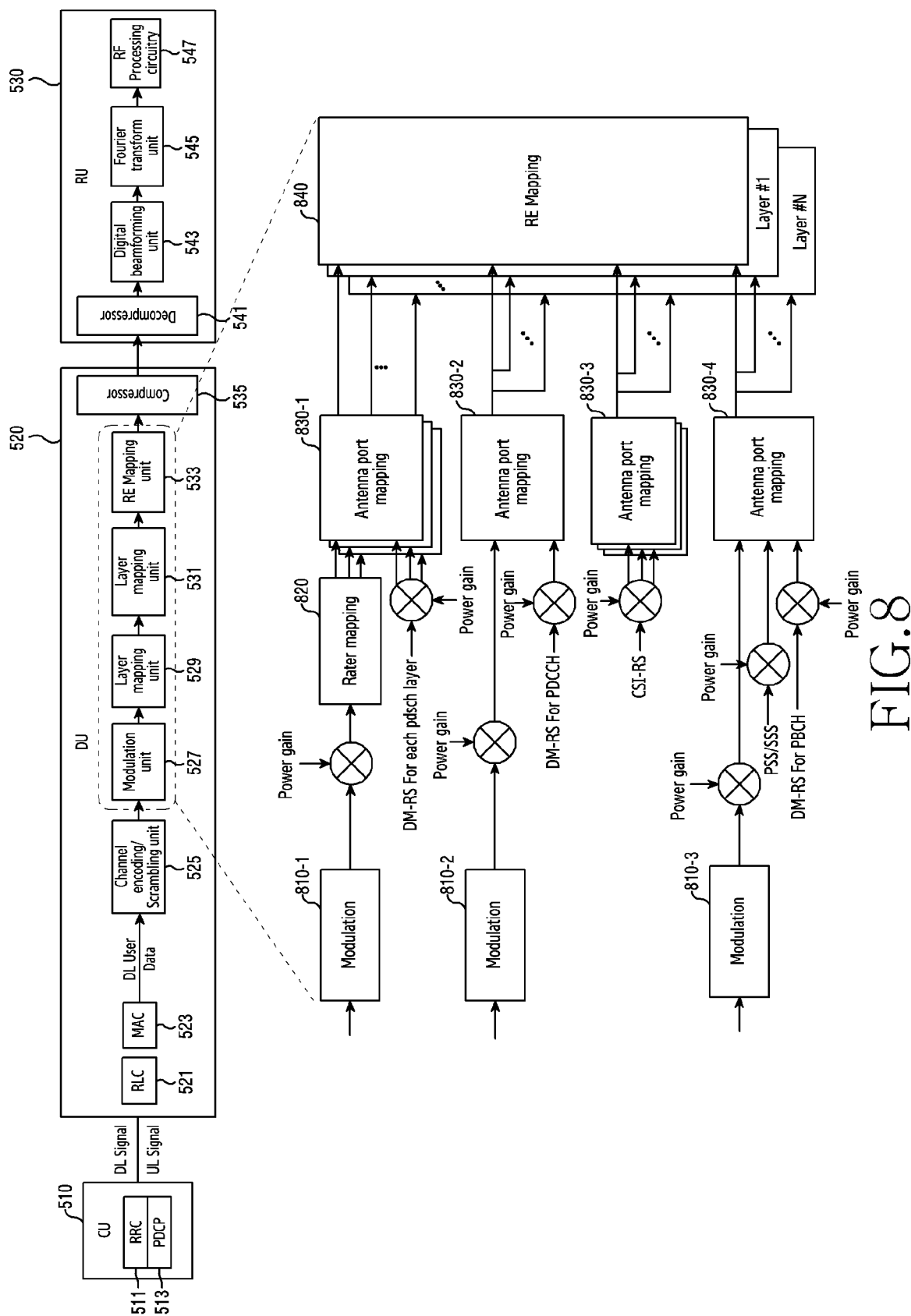
FIG. 8 illustrates operations of a digital unit (DU) related to modulation compression in a wireless communication system according to various embodiments of the present disclosure.

FIG. 8 illustrates operations of a DU related to modulation compression in a wireless communication system according to various embodiments of the present disclosure.

Referring to FIG. 8, modulation symbols may be generated by applying modulation 810-1 to a data signal corresponding to a physical downlink shared channel (PDSCH), and a power gain may be multiplied by each modulation symbol. Herein, the power gain may correspond to power control for adjusting a transmit signal strength by considering the actual channel environment in data transmission. Layer mapping 820 may be applied to the modulation symbol multiplied by the power gain, and antenna port mapping 830-1 may be applied to each layer. At this time, the power gain may also be multiplied by a demodulation reference signal (DM-RS) for each PDSCH layer, wherein the power gain may correspond to power control for adjusting a transmit signal strength of the DM-RS for the PDSCH layer. After the power gain is multiplied, antenna port mapping 830-1 may be applied to the DM-RS for each PDSCH layer.

Similarly, modulation symbols may be generated by applying modulation 810-2 to a control signal corresponding to a physical downlink control channel (PDCCH) for a data signal, and a power gain may be multiplied by each modulation symbol. Herein, the power gain may correspond to power control for adjusting the transmit signal strength of the control signal. Antenna port mapping 830-2 may be applied to the modulation symbol multiplied by the power gain. At this time, the power gain may also be multiplied by a DM-RS for the PDCCH, wherein the power gain may correspond to the power control for adjusting the transmit signal strength of the DM-RS for the PDCCH. After the power gain is multiplied, antenna port mapping 830-2 may be applied to the DM-RS for the PDCCH.

Similarly, a power gain for adjusting a transmit signal strength of a channel state information-reference signal (CSI-RS) may be multiplied by the CSI-RS, and antenna port mapping 830-3 may be applied to the CSI-RS multiplied by the power gain.

Similarly, modulation symbols may be generated by applying modulation 810-3 to a broadcast signal corresponding to a physical broadcast channel (PBCH) for a data signal, and each modulation symbol may be multiplied by a power gain. Herein, the power gain may correspond to power control for adjusting a transmit signal strength of the broadcast signal. Antenna port mapping 830-4 may be applied to the modulation symbol multiplied by the power gain. At this time, for a primary synchronization signal (PSS) and a secondary synchronization signal (SSS), a power gain for adjusting a transmit signal strength of the PSS/SSS may be multiplied, and antenna port mapping 830-4 may be applied to the PSS/SSS multiplied by the power gain. For the DM-RS for the PBCH, the power gain for adjusting the transmit signal strength of the DMRS for the PBCH may be multiplied, and the antenna port mapping 830-4 may be applied to the DM-RS multiplied by the power gain.

The signals mapped to the antenna ports through the antenna port mappings 830-1, 830-2, 830-3, and 830-4 (e.g., at least one of the data signal corresponding to the PDSCH, the control signal corresponding to the PDCCH, the DM-RS for the PDSCH, the DM-RS for the PDCCH, the CSI-RS, the broadcast signal corresponding to the PBCH, the DM-RS for the PBCH, the PSS, and the SSS) are allocated to layers, and RE mapping 840 which allocates multiple channels per layer (layer #0, layer #1, . . . , layer #N) is performed in terms of a frequency domain. Signals for which the RE mapping 840 is completed are sequentially inputted to the compressor 541, and the compressor 541 compresses the inputted signals in a physical resource block (PRB) unit. In other words, the compressor 541 may apply the modulation compression of the PRB unit to the inputted signals. One PRB may include 12 consecutive subcarriers in terms of the frequency domain. After the modulation compression is applied, the PRB may include subcarrier signals of several types. In various embodiments, the subcarrier signal may be referred to as a signal corresponding to each subcarrier (or, transmitted through each subcarrier) in the PRB, and the subcarrier signal may be used as the equivalent meaning to the channel in the present disclosure. Hereinafter, in FIG. 9, a structure of the subcarrier signals included in the PRB and a control signal for indicating them are described.

Figure 9:
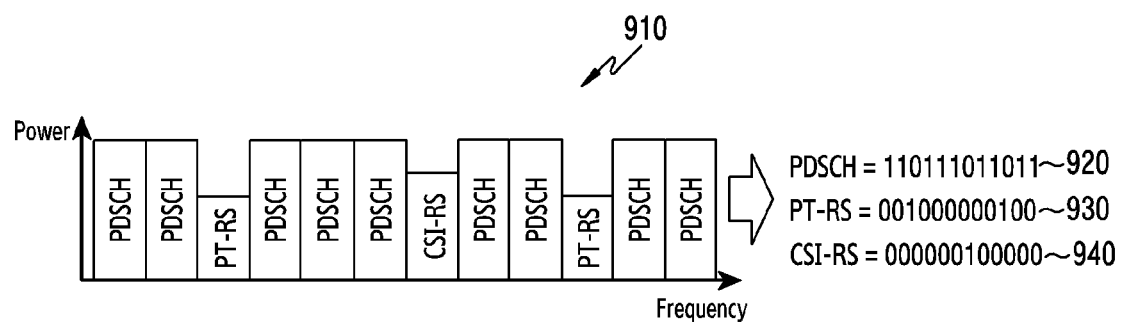
FIG. 9 illustrates subcarrier signals included in a physical resource block (PRB) after modulation compression is applied in a wireless communication system according to various embodiments of the present disclosure.

FIG. 9 illustrates subcarrier signals included in a PRB after modulation compression is applied in a wireless communication system according to various embodiments of the present disclosure.

Referring to FIG. 9, a PRB 910 may include 12 subcarrier signals. The PRB 910 may include the subcarrier signals of various types. For example, the PRB 910 may include subcarrier signals corresponding to the PDSCH, subcarrier signals corresponding to the PT-RS, and subcarrier signals corresponding to the CSI-RS. The types of the subcarrier signals illustrated in FIG. 9 are exemplary, and the PRB 910 may include subcarrier signals of other types. Accordingly, to allows the RU (e.g., 530) to identify the type of the subcarrier signal within the PRB 910 of the signal to which the modulation compression is applied, the DU (e.g., the DU 520) is required to direct to the RU a subcarrier position (or index) at which the subcarrier signal of a specific type is transmitted within the PRB 910. For example, the DU may transmit to the RU control information including position indication information 920 for the PDSCH, position indication information 930 for the PT-RS, and position indication information 940 for the CSI-RS. In various embodiments, the position indication information may indicate the position of the subcarrier at which the subcarrier signal of the specific type is transmitted in the PRB 910. Each position indication information may include a 12-bit bit stream and/or bit map, and each bit of the bit stream may correspond to the position or index of each subcarrier in the PRB 910. In various embodiments, the position indication information may correspond to reMask information, or may be included in reMask information.

For example, a bit value 1 in the bit stream of the position indication information 920 for the PDSCH may indicate that the PDSCH is transmitted at the corresponding subcarrier position in the PRB 910, and a bit value 0 may indicate that the PDSCH is not transmitted at the corresponding subcarrier position in the PRB 910. For example, since the PDSCH is transmitted on a first subcarrier (or a subcarrier index #0), a second subcarrier (or a subcarrier index #1), a fourth subcarrier (or a subcarrier index #3), a fifth subcarrier (or a subcarrier index #4), a sixth subcarrier (or a subcarrier index #5), an eighth subcarrier (or a subcarrier index #7), a ninth subcarrier (or a subcarrier index #8), an eleventh subcarrier (or a subcarrier index #10) and a twelfth subcarrier (or a subcarrier index #11) in the PRB 910, the bit stream of the position indication information 920 for the PDSCH may be expressed as '110111011011'.

As another example, a bit value 1 in the bit stream of the position indication information 930 for the PT-RS may indicate that the PT-RS is transmitted at the corresponding subcarrier position in the PRB 910, and a bit value 0 may indicate that the PT-RS is not transmitted at the corresponding subcarrier position in the PRB 910. For example, since the PT-RS is transmitted on a third subcarrier (or a subcarrier index #2) and a tenth subcarrier (or a subcarrier index #9) in the PRB 910, the bit stream of the position indication information 930 for the PT-RS may be expressed as '001000000100'.

As another example, a bit value 1 in the bit stream of the position indication information 940 for the CSI-RS may indicate that the CSI-RS is transmitted at a corresponding subcarrier position in the PRB 910, and a bit value 0 may indicate that the CSI-RS is not transmitted at the corresponding subcarrier position in the PRB 910. For example, since the CSI-RS is transmitted on a seventh subcarrier (or a subcarrier index #6) within the PRB 910, the bit stream of the position indication information 930 for the CSI-RS may be expressed as '000000100000'.

In FIG. 9, the position indication information 920 for the PDSCH, the position indication information 930 for the PT-RS and the position indication information 940 for the CSI-RS are described, which are exemplary, and position indication information for the subcarrier signal of other type may also be expressed identically. For example, if the PRB 910 includes the subcarrier signal corresponding to the PBCH, position indication information for the PBCH may be defined, and may be expressed similarly to a bit stream of other position indication information.

Referring to FIG. 9, the subcarrier signals included in the PRB 910 may have different transmit signal strengths (or transmit powers), and modulation information (e.g., modulation orders) of the subcarrier signals may be different from each other. For example, according to the 3GPP NR standard, the transmit power for each subcarrier signal or each channel is shown in Table 3 below:

TABLE 3

| Channel | Power range | Reference power |
|---|---|---|
| PDSCH | −15 dB~16 dB, Resolution: 1 dB (32 levels) | |
| DMRS_PDSCH | 0, 3, 4.77 dB (3 levels) | PDSCH |
| PT-RS | 0, 3, 4.7, 6, 7, 7.78 dB (6 levels) | PDSCH |
| CSI-RS | −3, 0, 3, 6 dB (4 levels) | SS-PBCH-BlockPower |
| PDCCH | 24 dB~23 dB, Resolution: 0.125 dB (384 levels) | SS-PBCH-BlockPower |
| DMRS_PDCCH | 24 dB~23 dB, Resolution: 0.125 dB (384 levels) | SS-PBCH-BlockPower |
| PSS | 0, 3 dB (2 levels) | SS-PBCH-BlockPower |
| SSS | Same as reference power | SS-PBCH-BlockPower |
| PBCH | Same as reference power | SS-PBCH-BlockPower |

Hence, to allow the RU to identify the transmit power for the subcarrier signal in the PRB 910 of the signal to which the modulation compression is applied, the DU is required to direct to the RU the transmit power for the subcarrier signal of a specific type transmitted in the PRB 910. For example, the DU may transmit to the RU control information including power indication information for the PDSCH, power indication information for the PT-RS, and power indication information for the CSI-RS. In various embodiments, the power indication information may indicate the transmit power for the subcarrier signal of the specific type transmitted in the PRB 910. If the PRB 910 includes subcarrier signals of other type than the subcarrier signals shown in FIG. 9, the DU may transmit to the RU control information including power indication information for the subcarrier signals of other type.

Figure 10A:
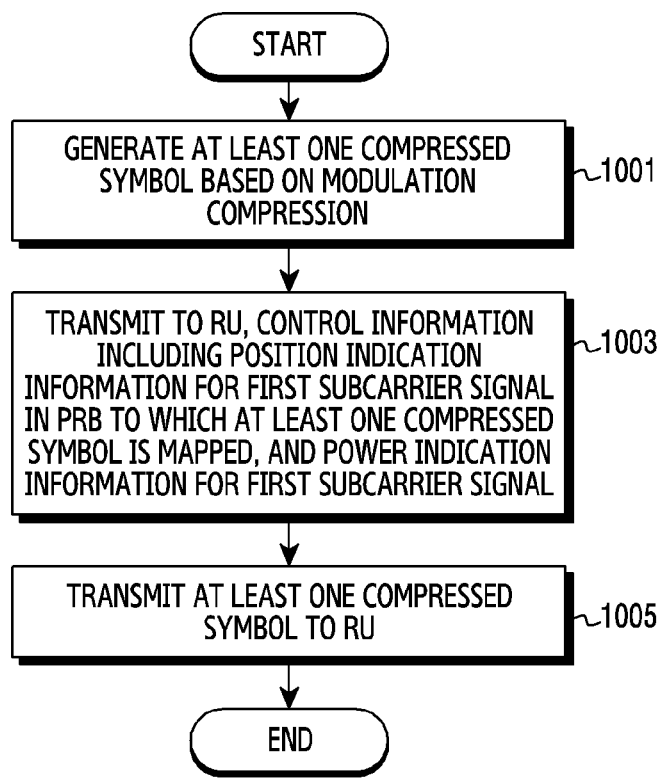
FIG. 10A is a flowchart of a DU in a wireless communication system according to various embodiments of the present disclosure.

FIG. 10A illustrates a flowchart of a DU in a wireless communication system according to various embodiments of the present disclosure. FIG. 10A illustrates operations of the DU 520. The operations illustrated in FIG. 10A may also be understood as operations of a base station (e.g., the base station 110) including the DU 520.

Referring to FIG. 10A, in step 1001, the DU generates at least one compressed symbol based on the modulation compression. For example, the DU may generate modulation symbols by modulating coded bits, and generate the compressed symbols by compressing the modulation symbols. To compress the modulation symbols, the DU may map a real value representing each modulation symbol to an index of a corresponding real value among possible real values for the modulation order of each modulation symbol, and determine the mapped index as at least one compressed symbol. The real value may include at least one of the I-phase component value of each modulation symbol, and the Q-phase component value of each modulation symbol. As another example, the DU does not generate explicit modulation symbols, but may generate the compressed symbol directly from the coded bits. That is, the DU may obtain the compressed symbols from the coded bits, based on the conversion table for the modulation compression. Herein, the conversion table for the modulation compression indicates the mapping relationship between the coded bits and each compressed symbol.

In step 1003, the DU transmits to the RU control information including position indication information for a first subcarrier signal, and power indication information for the first subcarrier signal in the PRB to which at least one compressed symbol is mapped. The position indication information for the first subcarrier signal may indicate a position of the subcarrier on which the first subcarrier signal is transmitted in the PRB for at least one compressed symbol. The power indication information for the first subcarrier signal may indicate the transmit power of the first subcarrier signal.

In various embodiments, the position indication information for the first subcarrier may be included in reMask which is set in a section header of the control information, and the power indication information for the first subcarrier may be included in modCompScaler set in a section extender of the control information. modCompScaler may be expressed by a product of a normalization factor for the modulation scheme applied to the first subcarrier signal, and the transmit power of the first subcarrier signal.

In various embodiments, the position indication information for the first subcarrier may include a bitmap for indicating the position of the subcarrier on which the first subcarrier signal is transmitted in the PRB, and each bit of the bitmap may correspond to the position or the index of each subcarrier within the PRB. For example, the position indication information for the PDSCH may include a bitmap such as the position indication information 920 of FIG. 9.

In various embodiments, the first subcarrier signal may include any one of PDSCH, PDCCH, DM-RS for PDSCH, DM-RS for PDCCH, CSI-RS, PBCH, PSS, or SSS. The control information may further include position indication information and power indication information for the second subcarrier signal, wherein the second subcarrier signal may include another one of the PDSCH, the PDCCH, the DM-RS for the PDSCH, the DM-RS for the PDCCH, the CSI-RS, the PBCH, the PSS, or the SSS.

In step 1005, the DU transmits at least one compressed symbol to the RU. The DU may transmit at least one compressed symbol to the RU, together with or separately from the control information, through the fronthaul. The RU may apply the decompression to the at least one compressed symbol, and communicate with a terminal over a wireless channel.

Figure 10B:
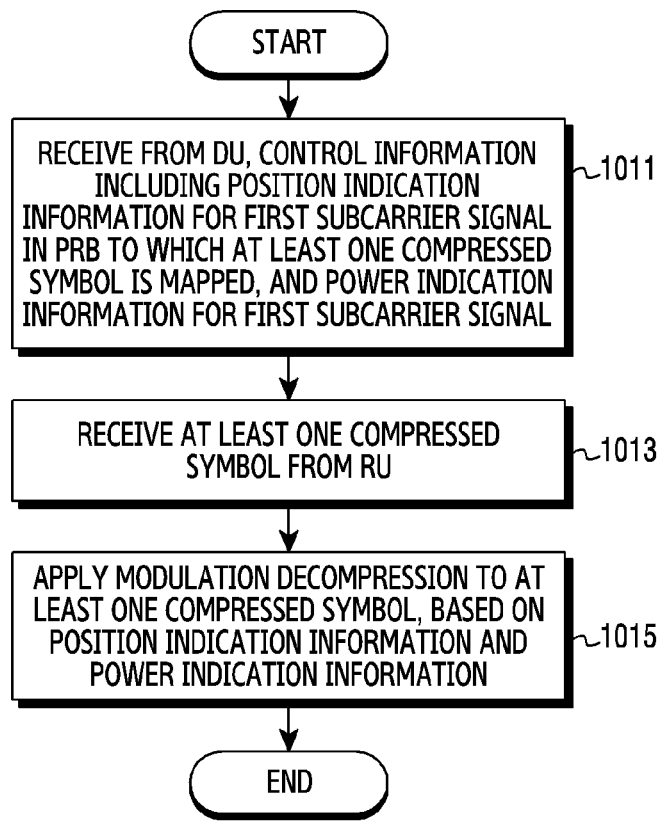
FIG. 10B is a flowchart of a radio unit (RU) in a wireless communication system according to various embodiments of the present disclosure.

FIG. 10B illustrates a flowchart of the RU in the wireless communication system according to various embodiments of the present disclosure. FIG. 10B illustrates operations of the RU 530. The operations illustrated in FIG. 10B may also be understood as operations of the base station (e.g., the base station 110) including the RU 530.

Referring to FIG. 10B, in step 1011, the RU receives from the DU the control information including the position indication information for the first subcarrier signal and the power indication information for the first subcarrier signal in the PRB to which at least one compressed symbol is mapped. The position indication information for the first subcarrier signal may indicate the position of the subcarrier on which the first subcarrier signal is transmitted in the PRB for at least one compressed symbol. The power indication information for the first subcarrier signal may indicate the transmit power of the first subcarrier signal.

In various embodiments, the position indication information for the first subcarrier may be included in reMask which is set in the section header of the control information, and the power indication information for the first subcarrier may be included in the modCompScaler which is set in the section extender of the control information. modCompScaler may be represented by the product of the normalization factor for the modulation scheme applied to the first subcarrier signal, and the transmit power of the first subcarrier signal.

In various embodiments, the position indication information for the first subcarrier may include the bitmap for indicating the position of the subcarrier on which the first subcarrier signal is transmitted in the PRB, and each bit of the bitmap may correspond to the position or the index of each subcarrier within the PRB. For example, the position indication information for the PDSCH may include the bitmap such as the position indication information 920 of FIG. 9.

In various embodiments, the first subcarrier signal may include any one of the PDSCH, the PDCCH, the DM-RS for the PDSCH, the DM-RS for the PDCCH, the CSI-RS, the PBCH, the PSS, or the SSS. The control information may further include the position indication information and the power indication information of the second subcarrier signal, wherein the second subcarrier signal may include another one of the PDSCH, the PDCCH, the DM-RS for the PDSCH, the DM-RS for the PDCCH, the CSI-RS, the PBCH, the PSS, or the SSS.

In step 1013, the RU receives at least one compressed symbol from the DU. The DU may transmit the at least one compressed symbol to the RU, together with or separately from the control information, through the fronthaul. The RU may apply the decompression to the at least one compressed symbol, and communicate with the terminal over the wireless channel.

In step 1015, the RU applies the modulation decompression to at least one compressed symbol, based on the position indication information and the power indication information. To apply the modulation decompression, the RU may obtain the modulation symbol from the compression symbol corresponding to the first subcarrier signal among at least one compression symbol, based on a conversion table for the modulation decompression. Herein, the conversion table may indicate correspondence between each compressed symbol for the modulation order and each modulation symbol for the modulation order. The RU may identify the position indication information corresponding to the subcarrier position or the subcarrier index of the first subcarrier signal. For example, the RU may identify reMask (i.e., position indication information) having the bit value 1 corresponding to the subcarrier position or the subcarrier index of the first subcarrier signal in bitmaps of a plurality of reMasks. The RU may identify the power gain from the power indication information corresponding to the position indication information, and apply a power gain to the modulation symbol.

FIG. 11 illustrates a structure of control information including position indication information and power indication information in a wireless communication system according to various embodiments of the present disclosure. In various embodiments, such control information may be referred to as a 'control (C)-plane control signal table'.

Referring to FIG. 11, control information 1100 may include a transport header 1110 indicating information of a transport stream, an application header 1120 indicating physical layer channel information such as frame information and transport slot information in a frame, a section header 1130 indicating information of sections constructing the physical layer information, and a section extender 1140 for selectively indicating additional information of the section information.

Referring to the section header 1130, a plurality of reMasks may be set in one section. reMask may include control information related to each beam identifier (ID) for multiple input multiple output (MIMO) in one section. According to various embodiments of the present disclosure, reMask may correspond to the position indication information. In other words, reMask may indicate the subcarrier position at which a subcarrier signal of a specific type is transmitted in each PRB as shown in FIG. 9, with respect to PRBs transmitted in the section ID. For example, if the PRBs belonging to the section ID include subcarrier signals of the same type, and the subcarrier position corresponding to the subcarrier signal of the specific type in each PRB is identical, the section header 1130 may include ReMasks corresponding to the number of the types of the subcarrier signals transmitted through PRBs belonging to the section ID with respect to the section ID. For example, if the PRB belonging to the section ID includes the subcarrier signals of three types (i.e., the PDSCH, the PT-RS, and the CSI-RS) as shown in FIG. 9, first reMask included in the section may include position indication information for the PDSCH, second reMask may include position indication information for the PT-RS, and third reMask may include position indication information for the PT-RS.

As described above, reMask may include the position indication information of the subcarrier signal. The power indication information of the subcarrier signal may be transmitted through modCompScaler expressed by 15 bits in the section extender 1140. In other words, modCompScaler may include the power indication information for the subcarrier signal. modCompScaler may represent a normalization factor for a specific modulation method. According to various embodiments of the present disclosure, modCompScaler may express the product of the normalization factor for the modulation scheme and the transmit power for the subcarrier signal with 15 bits.

According to various embodiments, the control information 1100 may include reMask (i.e., reMask including the position indication information for the PDSCH) indicating the subcarrier position at which the PDSCH is transmitted in the PRB of the signal to which the modulation compression is applied, and modCompScaler (i.e., modCompScaler including the power indication information for the PDSCH) for indicating the transmit power of the PDSCH. The transmit power of the PDSCH may be, for example, one of the possible transmit powers of the PDSCH described in Table 3 above.

According to various embodiments, the control information 1100 may further include reMask (i.e., reMask including the position indication information for the PT-RS) indicating the subcarrier position transmitting the PT-RS in the PRB of the signal to which the modulation compression is applied, and modCompScaler (i.e., modCompScaler including the power indication information for the PT-RS) for indicating the transmit power of the PT-RS. The transmit power of PT-RS may be, for example, one of the possible transmit powers of the PT-RS described in Table 3 above.

According to various embodiments, the control information 1100 may further include reMask (i.e., reMask including the position indication information for the CSI-RS) indicating the subcarrier position which transmits the CSI-RS in the PRB of the signal to which the modulation compression is applied, and modCompScaler (i.e., modCompScaler including the power indication information for the CSI-RS) for indicating the transmit power of the CSI-RS. The transmit power of the CSI-RS may be, for example, one of the possible transmit powers of the CSI-RS described in Table 3 above.

Figure 12:
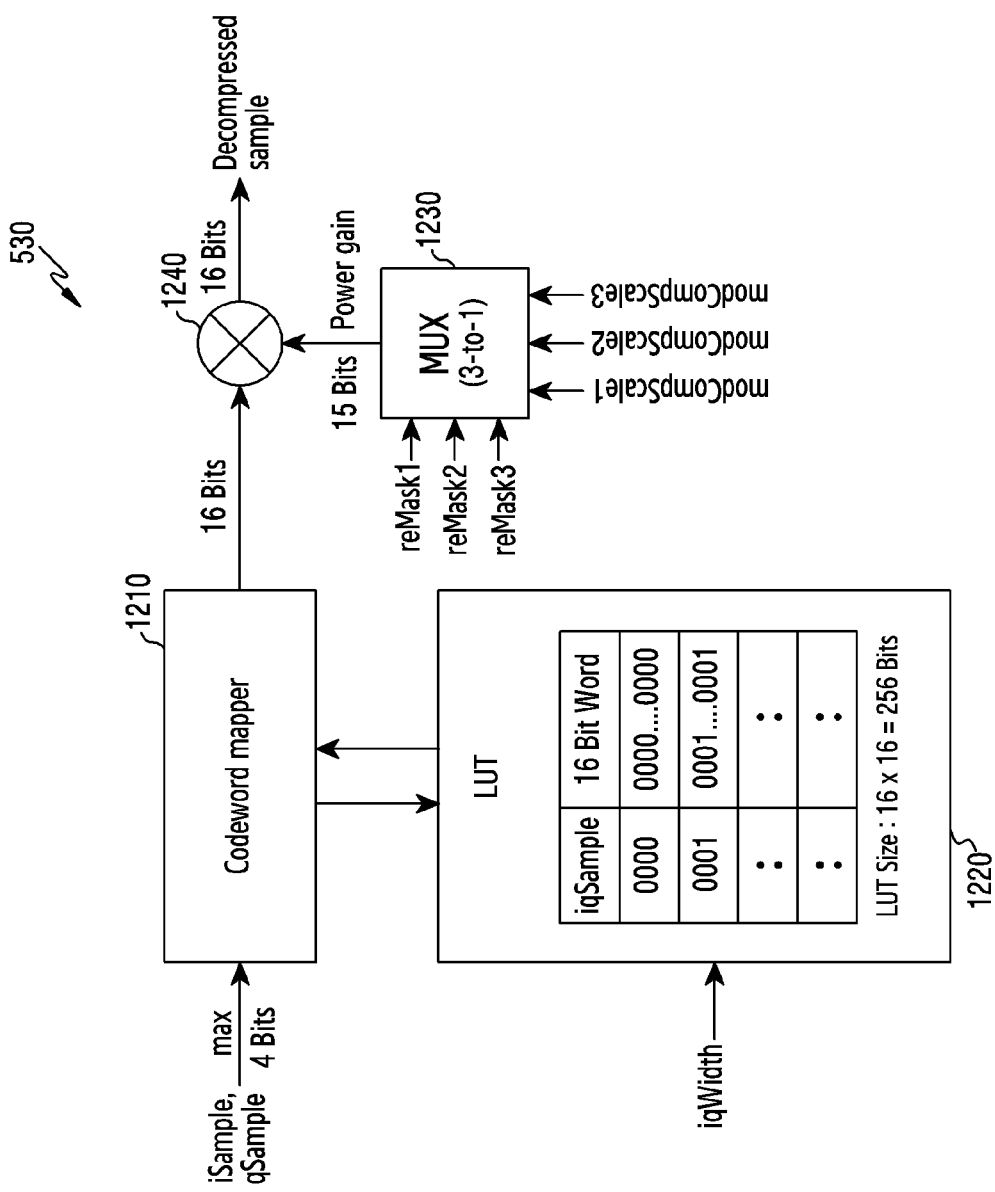
FIG. 12 illustrates decompression of compressed symbols performed at a decompression unit of an RU in a wireless communication system according to various embodiments of the present disclosure.

FIG. 12 illustrates decompression of compressed symbols performed at a decompression unit of an RU in a wireless communication system according to various embodiments of the present disclosure.

As described above, the DU may transmit to the RU control information (i.e., C-plane control information) including position indication information and power indication information, and compressed symbols through the fronthaul. The transmitted C-plane control information and compression symbols are received by the RU, and may be inputted to a decompression unit (e.g., the decompression unit 541) of the RU. In FIG. 12, detailed operations of such a decompression unit are explained. For convenience of descriptions, it is assumed that the PRB to which the compressed symbol is mapped includes subcarrier signals of three types, and the highest modulation order among modulation orders applied to the subcarrier signals respectively is 256QAM. However, the above-mentioned assumptions are exemplary, and various modifications are possible.

Referring to FIG. 12, since the highest modulation order is 256QAM, data (iSample and qSample) of the input signal for the decompression unit may be inputted to a codeword mapper 1210 in the unit of 4 bits. Also, ipwidth information indicating the bit unit (i.e., 4 bits) of the input signal may be inputted to a look-up-table (LUT) 1220. In various embodiments, the LUT 1220 may provide the codeword mapper 1220 with a conversion table corresponding to iqwidth information (i.e., corresponding to the modulation order). Herein, the conversion table is a conversion table for the modulation decompression, and represents the mapping relationship between the compressed symbol for the modulation order, and the modulation symbol for the modulation order. The codeword mapper 1210 may convert a 4-bit input signal, to a 16-bit modulation symbol based on the conversion table provided from the LUT 1220, and output the 16-bit modulation symbol.

Also, the position indication information and the power indication information included in the C-plane control signal may be inputted to a multiplexer (MUX) 1230. In FIG. 12, since the PRB to which the compressed symbol is mapped includes the subcarrier signals of three types, position indication information of three types (e.g., reMAsk1, reMAsk2, and reMask3) may be inputted to MUX 1230, and power indication information of three types (e.g., modCompScaler1, modCompScaler2, modCompScaler3) may be inputted. The MUX 1230 may output a power gain value for data of a corresponding order according to the input sequence of the data in the PRB.

More specifically, if first I-data and Q-data in the PRB (i.e., I-data and Q-data of the subcarrier signal corresponding to the subcarrier index #0 in the PRB) are sequentially inputted to the codeword mapper 1210 in the unit of 4 bits, the codeword mapper 1210 may retrieve a 16-bit signal (or modulation symbol) corresponding to the 4-bit I-data and Q-data in the conversion table provided from the LUT 1220, and output the retrieved 16-bit signal. The outputted 16-bit I-data and Q-data are inputted to a multiplier 1240. In addition, since the data inputted to the codeword mapper 1210 corresponds to the first data in the PRB (i.e., the subcarrier index #0 in the PRB), the MUX 1230 may identify the power gain from modCompScaler corresponding to reMask having the first bit 1 (i.e., the bit corresponding to the subcarrier position of the subcarrier index #0) of the three reMasks, and thus output the identified power gain. In various embodiments, if specific reMask is reMask for the first subcarrier signal (e.g., the PDSCH), modCompScaler corresponding to the reMask may be modCompScaler for the first subcarrier signal (e.g., the PDSCH). The outputted power gain is inputted to the multiplier 1240. The multiplier 1240 may output modulating symbols to which the transmit gain is applied (i.e., the decompressed symbols), by multiplying the I-data and the Q-data of the 16-bit format outputted from the codeword mapper 1210, and the power gain of the 15-bit format outputted from the MUX 1230.

The decompression unit determines whether the section ID included in the C-plane control information is changed. If the section ID is not changed, the decompression unit may perform the modulation decompression on the remaining data in the PRB, based on the same position indication information and power indication information. By contrast, if the section ID is changed (e.g., if the section ID increases), the decompression unit may initialize the MUX 1230, and thus input the position indication information and the power indication information corresponding to the section ID of the C-plane control information to the MUX 1230, to perform the decompression on data included in a next PRB. The decompression unit may convert each data in the next PRB based on the conversion table, apply the power gain determined from the initialized position indication information and power indication information to the converted data, and thus perform the modulation decompression.

In various embodiments, the power indication information "modCompScaler" includes information for indicating a power value which may be applied to the signal transmission of the base station (e.g., the base station 110), and may be expressed by 15 bits. The power indication information needs to represent not only lossless constellation scaling having the highest power control precision to ensure little (i.e., close to 0%) signal loss (error vector magnitude (EVM)) which may be caused by the modulation compression but also the optimized resolution of power adjustment. The 15-bit power indication information "modCompScaler" according to various embodiments of the present disclosure includes 3-bit information representing a standard absolute value (or the normalization factor) of the modulation order and 12-bit information indicating a power offset step, 6-bit information of the 12-bit information is an integer part value, and the remaining 6-bit information may include a fractional part or a fractional integer. In various embodiments, the 3 bits representing the standard absolute value of the modulation order may be the most significant bit (MSB), and the 12 bits representing the power offset step may be the least significant bit (LSB). The transmit power offset to be actually applied to each signal may be calculated based on <Equation 1> through <Equation 4> below.

First, to calculate the 15-bit power indication information "modCompScaler", the base station may determine the modulation order "ModulationOrder" value as shown in <Equation 1> below:

$$\text{ModulationOrder} = \Sigma_{k=12}^{14} mc\text{ScaleOffset}[k] \times 2^{k-12} \quad \text{Equation 1}$$

Herein, ModulationOrder denotes the modulation order, and mcScaleOffset[k] value denotes a bit value for a k-th bit of the power indication information "modCompScaler".

Next, the base station may calculate the transmit power offset PowerIndex value as shown in the following <Equation 2>:

$$\text{PowerIndex} = \Sigma_{k=0}^{11} mc\text{ScaleOffset}[k] \times 2^{k-6} \quad \text{Equation 2}$$

Herein, PowerIndex denotes a 12-bit value indicating the power offset step, and mcScaleOffset[k] value denotes the bit value for the k-th bit of the power indication information "modCompScaler". As described above, 6 bits of the 12-bit PowerIndex may be the integer part and the remaining 6 bits may be the fractional integer expressed by the fractional part.

The final 15-bit power indication information "modCompScaler" may be calculated as shown in <Equation 3> below:

$$mc\text{ScaleOffset} = f_1(\text{ModulationOrder}) \times f_2(\text{PowerIndex}) \quad \text{Equation 3}$$

Herein, mcScaleOffset corresponds to the power indication information modCompScaler, ModulationOrder denotes the modulation order, and PowerIndex denotes the power offset step. The function $f_1(\cdot)$ and/or the function $f_2(\cdot)$ may be standard absolute values.

The function $f_1(\cdot)$ of <Equation 3> may be expressed as <Equation 4> below:

$$f_1(n) = \sqrt{\frac{3}{2(4^n - 1)}} \qquad \text{Equation 4}$$

Herein, n denotes the modulation order "ModulationOrder".

The function $f_2(\cdot)$ of <Equation 3> may be expressed as <Equation 5> below:

$$f_2(\cdot) = 10^{\frac{n}{10}} \qquad \text{Equation 5}$$

Herein, n denotes the modulation order "ModulationOrder".

In various embodiments, the base station may be implemented to directly calculate the values of the functions $f_1(\cdot)$ and/or $f_2(\cdot)$ using hardware and/or software according to <Equation 4> and <Equation 5>. However, this is exemplary, and since computational complexity for calculating the values of the functions $f_1(\cdot)$ and/or $f_2(\cdot)$ may be high, the base station may be implemented to calculate the values of $f_1(\cdot)$ and/or $f_2(\cdot)$ using the LUT. For example, the LUT for the function $f_1(\cdot)$ may be presented as <Table 4> below.

TABLE 4

| Modulation scheme | Modulation order (n) | Normalization factor $f_1(\cdot)$ |
|---|---|---|
| BPSK | 1 | $\frac{1}{\sqrt{2}}$ |
| QPSK | 1 | $\frac{1}{\sqrt{2}}$ |
| 16QAM | 2 | $\frac{1}{\sqrt{10}}$ |
| 64QAM | 3 | $\frac{1}{\sqrt{42}}$ |
| 256QAM | 4 | $\frac{1}{\sqrt{170}}$ |
| 1024QAM | 5 | $\frac{1}{\sqrt{682}}$ |

The methods according to the embodiments described in the claims or the specification of the disclosure may be implemented in software, hardware, or a combination of hardware and software.

As for the software implementation, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. Also, a plurality of memories may be included.

In addition, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the disclosure. Thus, the scope of the disclosure is not limited and defined by the described embodiment and is defined not only the scope of the claims as below but also their equivalents.

The invention claimed is:

1. A digital unit (DU) in a wireless communication system, comprising:
   a transceiver; and
   at least one processor configured to:
     generate at least one compressed symbol based on modulation compression using an in-phase data (I-data) and a quadrature-phase data (Q-data), and wherein each of the I-data and the Q-data is represented by at least one bit determined based on modulation order;
     transmit, to a radio unit (RU) through a fronthaul, control information including:
       position indication information for indicating a position of a first subcarrier signal transmitted in a physical resource block (PRB) to which the at least one compressed symbol is mapped, and
       power indication information for indicating a transmit power of the first subcarrier signal associated with a scaler value for the modulation compression; and
     transmit the at least one compressed symbol to the RU.

2. The DU of claim 1,
   wherein the position indication information comprises reMask which is set in a section header of the control information,
   wherein the power indication information comprise modCompScaler which is set in a section extender of the control information.

3. The DU of claim 2, wherein the reMask is expressed by 12 bits, and
   wherein the modCompScaler is expressed by 15 bits.

4. The DU of claim 1, wherein the wireless communication system comprises a communication system to which a function split is applied, and
wherein the RU allows support for the modulation compression.

5. The DU of claim 1, wherein the control information further comprises position indication information for indicating a position of a second subcarrier signal transmitted in the PRB, and power indication information for indicating a transmit power of the second subcarrier signal,
wherein the first subcarrier signal comprises one of a physical downlink shared channel (PDSCH), a physical downlink control channel (PDCCH), a demodulation reference signal (DM-RS) for the PDSCH, a DM-RS for the PDCCH, a channel state information-reference signal (CSI-RS), a physical broadcast channel (PBCH), a primary synchronization signal (PSS), or a secondary synchronization signal (SSS), and
wherein the second subcarrier signal comprises another one of the PDSCH, the PDCCH, the DM-RS for the PDSCH, the DM-RS for the PDCCH, the CSI-RS, the PBCH, the PSS and the SSS.

6. A radio unit (RU) in a wireless communication system, comprising:
a transceiver; and
at least one processor configured to:
receive, from a digital unit (DU) through a fronthaul, control information including:
position indication information for indicating a position of a first subcarrier signal transmitted in a physical resource block (PRB) to which at least one compressed symbol is mapped, and
power indication information for indicating a transmit power of the first subcarrier signal associated with a scaler value for modulation compression,
receive, from the DU, the at least one compressed symbol; and
perform modulation decompression to the at least one compressed symbol, based on the position indication information and the power indication information,
wherein the at least one compressed symbol is generated based on modulation compression using an in-phase data (I-data) and a quadrature-phase data (Q-data), and wherein each of the I-data and the Q-data is represented by at least one bit determined based on modulation order.

7. The RU of claim 6,
wherein the position indication information comprises reMask which is set in a section header of the control information,
wherein the power indication information comprises modCompScaler which is set in a section extender of the control information.

8. The RU of claim 7, wherein
the reMask is expressed by 12 bits, and
wherein the modCompscaler is expressed by 15 bits.

9. The RU of claim 6, wherein the wireless communication system comprises a communication system to which function split is applied, and
wherein the RU allows support for the modulation compression.

10. The RU of claim 6, wherein the control information further comprises position indication information indicating a position of a subcarrier at which a second subcarrier signal is transmitted in the PRB, and power indication information for indicating a transmit power of the second subcarrier signal,
wherein the first subcarrier signal comprises one of a physical downlink shared channel (PDSCH), a physical downlink control channel (PDCCH), a demodulation reference signal (DM-RS) for the PDSCH, a DM-RS for the PDCCH, a channel state information-reference signal (CSI-RS), a physical broadcast channel (PBCH), a primary synchronization signal (PSS), or a secondary synchronization signal (SSS), and
wherein the second subcarrier signal comprises another one of the PDSCH, the PDCCH, the DM-RS for the PDSCH, the DM-RS for the PDCCH, the CSI-RS, the PBCH, the PSS and the SSS.

11. A method performed by a digital unit (DU) in a wireless communication system, the method comprising:
generating at least one compressed symbol based on modulation compression using an in-phase data (I-data) and a quadrature-phase data (Q-data), and wherein each of the I-data and the Q-data is represented by at least one bit determined based on modulation order;
transmitting, to a radio unit (RU) through a fronthaul, control information including:
position indication information for indicating a position of a first subcarrier signal transmitted in a physical resource block (PRB) to which the at least one compressed symbol is mapped, and
power indication information for indicating a transmit power of the first subcarrier signal associated with a scaler value for the modulation compression; and
transmitting the at least one compressed symbol to the RU.

* * * * *